(No Model.)
J. LUCAS.
COCKLE MACHINE.
No. 274,797. Patented Mar. 27, 1883.
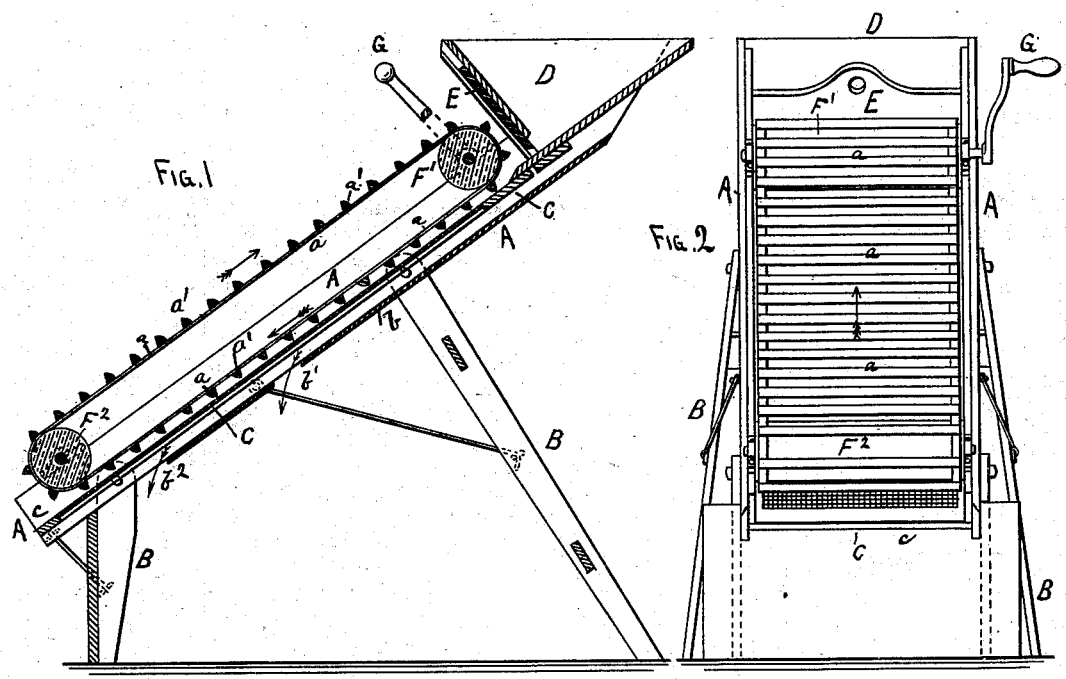
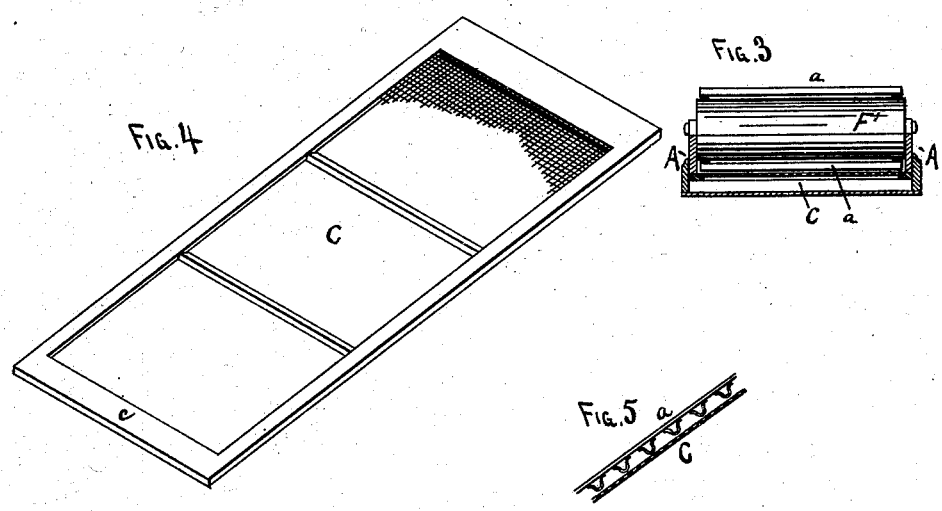
WITNESSES.
Louis Feeser Jr.
S. M. Magoffin.
John Lucas,
INVENTOR, BY
Louis Feeser & Co.
Atty's.

UNITED STATES PATENT OFFICE.

JOHN LUCAS, OF HASTINGS, MINNESOTA.

COCKLE-MACHINE.

SPECIFICATION forming part of Letters Patent No. 274,797, dated March 27, 1883.

Application filed May 16, 1881. (No model.)

*To all whom it may concern:*

Be it known that I, JOHN LUCAS, a citizen of the United States, residing at Hastings, in the county of Dakota and State of Minnesota, have made certain new and useful Improvements in Cockle-Machines, &c., of which the following is a specification.

This invention relates to machines for removing cockle and other deleterious seeds and substances from wheat and other grains; and it consists in an adjustable inclined frame covered with wire-cloth, over which the grain to be cleaned is permitted to run, and arranging above said inclined frame an endless slatted belt or apron adapted to travel in the same direction as the flowing grain, but at a slower rate of speed, whereby the grain is divided into as many separate lots or parcels as there are slats at one time opposite the screen, and a rolling motion imparted to the grain in each parcel, so that every kernel of grain is brought into contact with the wire-cloth once or more during its passage downward, to separate all foreign matter therefrom.

In the drawings, Figure 1 is a sectional elevation. Fig. 2 is a front elevation. Fig. 3 is a cross-sectional view. Fig. 4 is a perspective view of the screen-frame detached. Fig. 5 is a section of the slatted belt, showing a variation in the manner of constructing the slats.

A is an inclined casing, mounted upon adjustable legs B, so that its angle of inclination may be readily varied, and provided with a wire-cloth-covered screen, C, and hopper D, as shown. This hopper is supplied with an adjustable door or slide, E, so that the amount of grain flowing through may be regulated and controlled.

Across either end of the frame A, above the screen C, rollers $F'$ $F^2$ are mounted, over which an endless slatted belt or apron, $a$, runs, the slats on the lower side running very close to or lying upon the screen. This belt is adapted to be revolved in any suitable manner, a hand-crank, G, being shown in the drawings, and will be run at a speed slightly less than the natural flow of the grain down the inclined screen, so that the grain will be retarded somewhat and divided up into small lots or parcels between the lower row of slats, leaving portions of the screen loaded and portions empty. By this action of the slats the grain is prevented from passing over the screen in an unbroken stream, but is broken up into small parcels, as above described, and, the upper layers of grain traveling faster than the lower ones, the grain in each separate lot rolls over and over as it flows downward, so that every kernel of grain at some stage of its progress comes in contact with the screen once or more, and thus every particle of matter shorter than the grain to be cleaned is sifted through the screen upon the inclined boards $b$, and escapes at the openings $b'$ $b^2$, while the clean grain only passes over the tail $c$.

The angle of inclination of the screen and the size of the opening beneath the slide E of the hopper may be altered to suit different qualities and conditions of grain, and the speed of the belt or apron may be varied for the same purpose.

Screens with different sizes of mesh of wire-cloth may be used to adapt the machine to the different varieties of grain, &c., and thus enable the machine to separate any kind of grain. It may also be used in connection with fanning-mills, thrashing-machines, &c.

The slats on the endless belt or apron may be made, as shown in Fig. 5, of strips of rubber or other flexible material "crimped" up, as shown, the advantage gained by this arrangement being that the flexible slat follows any irregularities in the screen, or "gives" in case any hard substance is met with.

I do not wish to confine myself to any particular form or manner of arranging the screen, as I am aware that it may be arranged in many ways.

What I claim as new is—

1. The cockle-separator, substantially as described and shown, consisting of the inclined frame, the hopper placed at the upper end of the frame, the inclined screen C, having its upper end abutting against the hopper below the discharge-opening thereof, the inclined boards $b$, placed below the screen C and provided with the discharge-openings $b'$ $b^2$, and the endless slatted belt $a$, revolving close to the screen C, as set forth.

2. In a cockle-separator, the combination of the inclined screen C, and the endless belt $a$, arranged above and parallel with the screen, and the cross-slats $a'$, fixed upon the belt $a$, and having their outer edges in contact with or in very close proximity to the screen, whereby the grain in its descent is held in banks against the edges of said slats and upon the surface of the screen, as set forth.

In testimony whereof I have hereunto set my hand in the presence of two subscribing witnesses.

JOHN LUCAS.

Witnesses:
C. N. WOODWARD,
LOUIS FEESER, Sr.